(12) United States Patent
Mitra et al.

(10) Patent No.: US 11,989,647 B2
(45) Date of Patent: May 21, 2024

(54) SELF-LEARNING SCHEDULER FOR APPLICATION ORCHESTRATION ON SHARED COMPUTE CLUSTER

(71) Applicant: Adobe Inc., San Jose, CA (US)

(72) Inventors: Subrata Mitra, Bangalore (IN); Nikhil Sheoran, Chandigarh (IN); Ramanuja Narasimha Simha, Karnataka (IN); Shanka Subhra Mondal, West Bengal (IN); Neeraj Jagdish Dhake, Maharashtra (IN); Ravinder Nehra, Haryana (IN)

(73) Assignee: Adobe Inc., San Jose, CA (US)

( * ) Notice: Subject to any disclaimer, the term of this patent is extended or adjusted under 35 U.S.C. 154(b) by 1226 days.

(21) Appl. No.: 16/271,642

(22) Filed: Feb. 8, 2019

(65) Prior Publication Data
US 2020/0257968 A1  Aug. 13, 2020

(51) Int. Cl.
*G06N 3/08* (2023.01)
*G06F 9/48* (2006.01)
(Continued)

(52) U.S. Cl.
CPC ............. *G06N 3/08* (2013.01); *G06F 9/4881* (2013.01); *H04L 67/51* (2022.05); *H04L 67/60* (2022.05)

(58) Field of Classification Search
CPC ........ G06N 3/08; G06N 20/00; G06F 9/4881; G06F 18/214; G06F 9/45558;
(Continued)

(56) References Cited

U.S. PATENT DOCUMENTS

| 7,047,517 B1 * | 5/2006 | Brown ............... G06F 9/465 700/121 |
| 7,209,657 B1 * | 4/2007 | Islam ............... H04Q 11/0005 398/48 |

(Continued)

FOREIGN PATENT DOCUMENTS

CN        102769615 A   * 11/2012

OTHER PUBLICATIONS

Atallah, Ribal, Chadi Assi, and Maurice Khabbaz. "Deep reinforcement learning-based scheduling for roadside communication networks." In 2017 15th International Symposium on Modeling and Optimization in Mobile, Ad Hoc, and Wireless Networks (WiOpt), pp. 1-8. IEEE, 2017. (Year: 2017).*

(Continued)

*Primary Examiner* — Ninos Donabed
(74) *Attorney, Agent, or Firm* — Shook, Hardy & Bacon L.L.P.

(57) ABSTRACT

The technology described herein is directed to a self-learning application scheduler for improved scheduling distribution of resource requests, e.g., job and service scheduling requests or tasks derived therefrom, initiated by applications on a shared compute infrastructure. More specifically, the self-learning application scheduler includes a reinforcement learning agent that iteratively learns a scheduling policy to improve scheduling distribution of the resource requests on the shared compute infrastructure. In some implementations, the reinforcement learning agent learns inherent characteristics and patterns of the resource requests initiated by the applications and orchestrates placement or scheduling of the resource requests on the shared compute infrastructure to minimize resource contention and thereby improve application performance for better overall user-experience.

17 Claims, 13 Drawing Sheets

(51) Int. Cl.
  *H04L 67/51* (2022.01)
  *H04L 67/60* (2022.01)
(58) Field of Classification Search
  CPC . G06F 2009/45562; G06F 2009/45595; H04L 67/16; H04L 67/32; H04L 67/51; H04L 67/60; H04L 67/34; H04L 67/10
  USPC .......................................................... 706/21
  See application file for complete search history.

(56) References Cited

U.S. PATENT DOCUMENTS

| | | | | |
|---|---|---|---|---|
| 7,260,655 | B1* | 8/2007 | Islam | H04Q 11/0005 709/252 |
| 7,991,632 | B1* | 8/2011 | Morris | G06Q 10/0631 705/7.14 |
| 8,146,040 | B1* | 3/2012 | Janneck | G06F 30/34 716/132 |
| 10,136,244 | B2* | 11/2018 | Bhalla | H04W 4/70 |
| 10,396,919 | B1* | 8/2019 | O'Shea | H04L 25/0254 |
| 2004/0088186 | A1* | 5/2004 | Anvekar | G06Q 30/0283 455/13.1 |
| 2006/0080456 | A1* | 4/2006 | Hur | H04L 65/1043 709/231 |
| 2007/0070939 | A1* | 3/2007 | Hottinen | H04B 7/0647 370/328 |
| 2011/0072436 | A1* | 3/2011 | Gilat | G06F 9/4881 718/104 |
| 2011/0161403 | A1* | 6/2011 | Fu | H04L 67/568 715/764 |
| 2012/0096165 | A1* | 4/2012 | Madduri | H04L 41/5006 709/226 |
| 2012/0185355 | A1* | 7/2012 | Kilroy | G06Q 30/0633 705/26.8 |
| 2012/0185506 | A1* | 7/2012 | Gomez Maturana | H04L 67/10 707/769 |
| 2014/0113600 | A1* | 4/2014 | El Gamal | H04L 47/823 455/414.3 |
| 2014/0337273 | A1* | 11/2014 | Bentley | G06N 5/022 706/46 |
| 2016/0299785 | A1* | 10/2016 | Anghel | G06F 9/5027 |
| 2017/0195458 | A1* | 7/2017 | Parekh | G06F 9/547 |
| 2018/0165603 | A1* | 6/2018 | Van Seijen | G06N 3/0454 |
| 2018/0293463 | A1* | 10/2018 | Brown | G06F 30/20 |
| 2019/0205182 | A1* | 7/2019 | Sivasubramanian | G06F 9/542 |
| 2019/0207867 | A1* | 7/2019 | Sivasubramanian | G06F 9/541 |
| 2019/0213099 | A1* | 7/2019 | Schmidt | G06N 3/044 |
| 2019/0227533 | A1* | 7/2019 | Shih | G05B 19/41865 |
| 2019/0235484 | A1* | 8/2019 | Ristovski | G06F 17/11 |
| 2020/0034197 | A1* | 1/2020 | Nagpal | G06F 9/50 |
| 2020/0065718 | A1* | 2/2020 | Moore | G06Q 10/02 |
| 2020/0266910 | A1* | 8/2020 | O'Shea | H04L 25/0252 |

OTHER PUBLICATIONS

Boutin, E., Ekanayake, J., Lin, W., Shi, B., Zhou, J., Qian, Z., . . . & Zhou, L. (2014). Apollo: Scalable and coordinated scheduling for cloud-scale computing. In 11th {USENIX} Symposium on Operating Systems Design and Implementation ({OSDI} 14) (pp. 285-300).

The evolution of cluster scheduler architectures. (Mar. 9, 2016). Cambridge Systems at Scale (CamSAS) Blog. 6 pages.

Bin Packing. (2002). The Icon Programming Language. University of Arizona. Retrieved from the Internet Oct. 6, 2020 at <https://www2.cs.arizona.edu/icon/oddsends/bpack/bpack.htm>. 3 pages.

Burns, B., Grant, B., Oppenheimer, D., Brewer, E., & Wilkes, J. (2016). Lessons learned from three container-management systems over a decade. Communications of ACM.

Everts, T. (Mar. 9, 2017). Downtime vs. Slowtime: Which Hurts More? DZone. Retrieved from the Internet Oct. 6, 2020 at <https://dzone.com/articles/downtime-vs-slowtime-which-hurts-more>. 5 pages.

Miller, R. (Jun. 28, 2018). Facebook is using machine learning to self-tine its myriad services. TechCrunch. Retrieved from the Internet Oct. 6, 2020 at <https://techcrunch.com/2018/06/28/facebook-is-using-machine-learning-to-self-tune-its-myriad-of-services/>. 3 pages.

Wikipedia contributors. (Sep. 17, 2020). Thrashing (computer science). In Wikipedia, The Free Encyclopedia. Retrieved 19:28, Oct. 6, 2020, from https://en.wikipedia.org/w/index.php?title=Thrashing_(computer_science)&oldid=978873670.

Joshi, A., Leung, A., Dwyer, C., Kung, F., Dhillon, S., Bak, T., Spyker, A., Bozarth, T. (Apr. 18, 2018). Titus, the Netflix container management platform, is now open source. Netflix Technology Blog. Medium. Retrieved Oct. 6, 2020 from the Internet at <https://netflixtechblog.com/titus-the-netflix-container-management-platform-is-now-open-source-f868c9fb5436>. 7 pages.

Agarwal, S., Kandula, S., Bruno, N., Wu, M. C., Stoica, I., & Zhou, J. (2012). Reoptimizing data parallel computing. In Presented as part of the 9th {USENIX} Symposium on Networked Systems Design and Implementation ({NSDI} 12) (pp. 281-294).

Ernst, A. T., Jiang, H., Krishnamoorthy, M., & Sier, D. (2004). Staff scheduling and rostering: A review of applications, methods and models. European journal of operational research, 153(1), 3-27.

Hastings, W. K. (1970). Monte Carlo sampling methods using Markov chains and their applications.

Konda, V. R., & Tsitsiklis, J. N. (2000). Actor-critic algorithms. In Advances in neural information processing systems (pp. 1008-1014).

Mao, H., Alizadeh, M., Menache, I., & Kandula, S. (Nov. 2016). Resource management with deep reinforcement learning. In Proceedings of the 15th ACM Workshop on Hot Topics in Networks (pp. 50-56).

Sutton, R. S., McAllester, D. A., Singh, S. P., & Mansour, Y. (2000). Policy gradient methods for reinforcement learning with function approximation. In Advances in neural information processing systems (pp. 1057-1063).

Wilke, A., Bischof, J., Gerlach, W., Glass, E., Harrison, T., Keegan, K. P., . . . & Chaterji, S. (2016). The MG-RAST metagenomics database and portal in 2015. Nucleic acids research, 44(D1), D590-D594.

* cited by examiner

SELF-LEARNING SCHEDULER FOR APPLICATION ORCHESTRATION ON SHARED COMPUTE CLUSTER

TECHNICAL FIELD

Aspects of the disclosure are related to the field of machine learning and artificial intelligence, and in particular, to a self-learning application scheduler for improved application performance orchestration on a platform.

BACKGROUND

In task-based systems, tasks can be derived from jobs or services run in the context of applications distributed over network computing (or compute) nodes. The computing nodes each have a set of underlying resources, e.g., processing units, on which the applications can be executed. The processing units can include, for example, processing threads of a single processor, individual cores of a multi-core chip, computers of a computer network, containers of a cloud computing system, etc. Scheduling the jobs or services initiated by the applications often involves decomposing the jobs or services into tasks, selecting the processing units to perform the tasks, and choosing a time to assign the tasks to the processing units.

Typically, each computing node has its own scheduler that determines how to allocate the node's available computing resources among the jobs and services initiated by different applications running on the node. Conventional scheduling techniques schedule the jobs and services primarily based on intuitions and manually crafted heuristics that tend to closely monitor resource usage of the different applications and schedule jobs and services to balance the resources.

Deploying software services and applications on a Cloud, e.g., cloud-scale computing clusters, or Datacenter often involves utilizing containers. A container is a standard unit of software, e.g., application or portion of an application (or microservice), that packages up a piece of code and all its dependencies, so the code runs quickly and reliably from one computing environment to another. Indeed, containers are lightweight, stand-alone, executable packages of software that include everything needed to run including code, runtime, system tools, system libraries, and settings.

Containers typically share a set of underlying resources or infrastructure, e.g., CPU, cache, I/O, network, memory-bandwidth, etc. For example, containers are often deployed on clusters of virtual machines in a multi-tenancy where they share the underlying resources. In such instances, resource distribution is managed by a scheduler included as part of an orchestration engine or framework. The role of orchestration and scheduling within a containerized application platform is to match applications to resources. Indeed, efficiently scheduling the computation jobs or services over the cloud-scale computing clusters is critical for job performance, system throughput, and resource utilization. This scheduling is becoming increasing challenging with growing cluster sizes and more complex workloads with diverse characteristics.

Existing container orchestration engines utilize conventional scheduling techniques similar to those discussed above to schedule jobs and services initiated by applications on other shared resources. Indeed, the conventional scheduling techniques are primarily based on intuitions and manually crafted heuristics that tend to closely monitor resource usage of different applications and schedule jobs and services to balance the resources.

Consequently, whether applications are containerized, e.g., encapsulated by one or more containers, or run directly on the shared compute infrastructure or hardware, the conventional scheduling techniques are generally serviceable in ensuring that the shared resources are allocated among jobs and services. However, these conventional scheduling techniques cannot understand and optimize for diurnal and seasonal variations, interpret hidden dependencies among different applications, or optimize for resource competition or interference. Consequently, user-experience degradation (e.g., in terms of user perceived response time) can, and often does, occur as a result of resource competition and interference among the resource requests.

SUMMARY

One or more embodiments described herein, among other benefits, solve one or more of the foregoing or other problems in the art by providing systems, methods, and non-transitory computer readable media that improve application performance orchestration on a platform using a self-learning application scheduler.

In some implementations, the technology described includes one or more computer readable storage media having a reinforcement learning agent stored thereon for orchestrating scheduling of resource requests, e.g., jobs and services or tasks derived therefrom, initiated by applications on a shared compute infrastructure. The reinforcement learning agent includes a deep neural network configured to approximate an optimum scheduling policy that is iteratively learned using reinforcement learning and program instructions that, when executed by one or more processing systems of a computing apparatus, direct the computing apparatus to capture and feed an input space representation to the deep neural network for predicting one or more machines of multiple machines of the shared compute infrastructure on which to schedule incoming resource requests. The input space representation is indicative of a time-series of resource utilization of resource requests scheduled on the shared compute infrastructure and incoming resource requests initiated by the applications.

In some implementations, the technology described includes a reinforcement learning-based system for scheduling distribution of resource requests initiated by applications on a shared compute infrastructure. The reinforcement learning-based system includes at least one processor and one or more non-transitory computer readable storage media storing instructions that, when executed by the at least one processor, iteratively cause the system to execute a reinforcement-based learning technique for learning an optimum scheduling policy. Indeed, the reinforcement-based learning technique includes scheduling incoming resource requests initiated by the applications on one or more selected machines of multiple machines of the shared compute infrastructure based on a scheduling policy approximated by a deep neural network and observing a state of the shared compute infrastructure occurring as a result of the scheduling. The reinforcement-based learning technique further includes calculating a reward or penalty based on the observed state of the shared compute infrastructure and refining the scheduling policy based on the reward or penalty to maximize an expected future reward or minimize an expected future penalty.

In some implementations, the technology described includes a reinforcement learning agent. The reinforcement learning agent includes at least a state observation module, a reward/penalty generation module and a scheduling action determination module. The state observation module is configured to observe a state of a shared compute infrastructure occurring as a result of scheduling one or more incoming resource requests initiated by applications on one or more machines of multiple machines of a shared compute infrastructure. The reward/penalty generation module configured to calculate a reward or penalty based on the observed state of the shared compute infrastructure. The scheduling action determination module configured to select, based on a scheduling policy, the one or more machines of the multiple machines of the shared compute infrastructure on which to schedule the one or more incoming resource requests and iteratively learn the scheduling policy based on the calculated reward or penalty.

In some implementations, the technology described includes a method for iteratively learning a scheduling policy to improve scheduling distribution of resource requests initiated by applications on a shared compute infrastructure. The method includes selecting a scheduling action based on a scheduling policy, performing the scheduling action, calculating a reward or penalty based on an observed state of the shared compute infrastructure, and feeding the reward or penalty to a deep neural network that approximates a function representative of the scheduling policy to iteratively learn the scheduling policy. In such implementations, the scheduling policy is a probability distribution over scheduling actions given a state of the shared compute infrastructure. The scheduling action indicates one or more machines of multiple machines of the shared compute infrastructure on which to schedule one or more resource requests initiated by one or more applications.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1A:
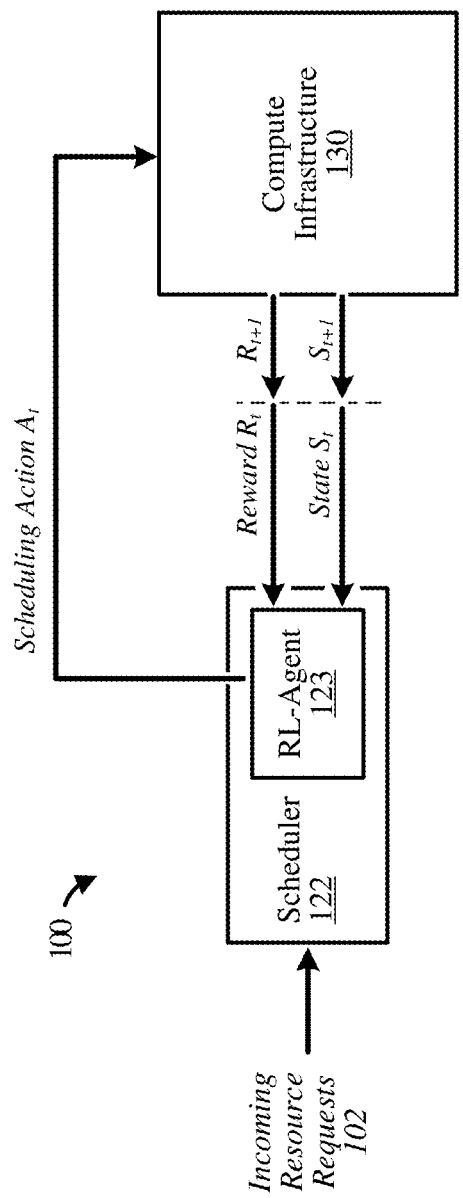
FIG. 1A depicts a block diagram illustrating an example computing platform including a self-learning application scheduler operable to utilize reinforcement learning agent (RL-Agent) to efficiently schedule tasks related to resource requests initiated by applications, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

The technology described herein is directed to a self-learning application scheduler for improved scheduling distribution of resource requests, e.g., job and service scheduling requests or tasks derived therefrom, initiated by applications on a shared compute infrastructure. More specifically, the self-learning application scheduler includes a reinforcement learning agent that iteratively learns a scheduling policy to improve scheduling distribution of applications on the shared compute infrastructure. Indeed, the reinforcement learning agent learns inherent characteristics and patterns of the resource requests initiated by the applications and orchestrates placement or scheduling of the resource requests on the shared compute infrastructure to minimize resource contention and thereby improve application performance for a better overall user-experience. As discussed herein, the applications can be containerized, e.g., encapsulated by one or more containers, or run directly on the shared compute infrastructure or hardware.

In some implementations, the reinforcement learning agent is configured to interact with a system, e.g., a shared compute infrastructure or compute cluster, to learn an optimized policy that minimizes application slowdown by taking scheduling actions, e.g., scheduling the resource requests on machines of the shared compute infrastructure, and observing how those scheduling actions affect a state of the system. The observed state results in a reward (or penalty) when the system achieves (or does not achieve) a desirable system property, e.g., resource contention among applications, scheduling delay, etc. The reinforcement learning agent attempts to maximize the received reward (or minimize the received penalty) to iteratively learn the optimized scheduling policy.

Among other benefits, the self-learning application scheduler can capture and encode various complexities in a scheduling policy that were previously unaccounted for by conventional scheduling techniques. For example, the self-learning application scheduler can account for diurnal and seasonal variations, can interpret hidden dependencies among different applications, and can optimize for resource competition or interference. Indeed, the self-learning application scheduler can proactively schedule applications to minimize interference resulting in improved application performance and, by correlation, better user-experience (e.g., in terms of user perceived response time).

Various technical effects are enabled by the techniques discussed herein. Among other benefits, the self-learning application scheduler scalably models and encodes application level characteristics in scheduling decisions, quantifies and predicts potential impacts due to interference, and architects a learning mechanism using feedback signals (penalties and/or rewards) to iteratively learn the optimal scheduling strategy.

As used herein, the term "neural network" (or artificial neural network) refers to a machine-learning model that can be tuned (e.g., trained) to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms In other words, a neural network is an algorithm that implements learning techniques, i.e., machine learning that utilizes a set of algorithms to attempt to model high-level abstractions in data.

Similarly, the term "deep neural network" refers to an artificial neural network with multiple layers between the input and output layers. A deep neural network finds the correct mathematical manipulation to turn the input into the output, whether it be a linear relationship or a non-linear relationship. The network moves through the layers calculating the probability of each output. Each mathematical manipulation as such is considered a layer, and complex deep neural networks can have many layers.

As used herein, the term "shared compute infrastructure" refers to a system or collection of systems that are shared among applications. The system or collection of systems may include server computers, blade servers, rack servers, and any other type of computing system (or collection thereof) suitable for executing the applications or microservices associated therewith. Such systems may employ one or more virtual machines, containers, or any other type of virtual computing resource.

As used herein, the term "resources" refers to one or more individual components of the shared compute infrastructure that are shared among applications. The shared set of resources can include processing units, e.g., CPU, cache, I/O, network, memory-bandwidth, etc. For example, in task-based systems, tasks can be derived from jobs or services run in the context of applications distributed over a network computing (or compute) nodes. The computing nodes collectively comprise a shared compute infrastructure. Indeed, the computing nodes each have a set of underlying resources, e.g., processing units, on which the applications can be executed. The processing units can include, for example, processing threads of a single processor, individual cores of a multi-core chip, computers of a computer network, containers of a cloud computing system, etc. Likewise, containers are often deployed on clusters of virtual machines in a multi-tenancy where they share underlying resources (e.g., shared compute infrastructure). In such instances, resource distribution is managed by a scheduler included as part of an orchestration engine or framework.

As used herein, the term "self-learning application scheduler" refers to a scheduler that uses machine learning algorithms and artificial intelligence to determine how to allocate shared computing resources among applications. For example, the self-learning application scheduler can utilize a reinforcement learning agent to efficiently predict on which of the shared resources to schedule incoming resource requests for minimizing resource contention and thereby improve application performance for a better overall user-experience. The self-learning application scheduler then uses the predictions generated by the reinforcement learning agent to schedule tasks related to the incoming resource requests, i.e., perform a scheduling action.

As used herein, the term "reinforcement learning agent" refers to a reinforcement learning-based agent that iteratively learns an optimum scheduling policy for efficiently predicting on which of one or more shared resources to schedule incoming resource requests for minimizing resource contention. For example, the reinforcement learning agent includes a policy network that can be represented by a deep neural network. The deep neural network approximates a scheduling policy that is iteratively learned using a reinforcement learning algorithm. More specifically, the reinforcement learning agent predicts a scheduling action, observes a change in a state of the shared resources (or infrastructure) occurring as a result of performing the scheduling action, calculates a reward or penalty based on the change in state, and uses the reward or penalty to further learn (train or refine) the scheduling policy to maximize future rewards or minimize future penalties.

As used herein, the term "application cluster" refers to a cluster of applications. Application clustering (sometimes called software clustering) is a technique for transforming otherwise disparate computing systems into a group of servers that acts like a single system. For example, a distributed computing platform can be representative of a containerized application cluster consisting of at least one master node, e.g., container orchestration engine, and multiple compute nodes, e.g., compute nodes. Clustering software is typically installed on each of the servers which maintain the same or similar information. One or more of the servers can perform administrative tasks such as load balancing, determining node failures, assigning failover duty, etc.

FIG. 1A depicts a block diagram illustrating an example computing platform 100a including a self-learning application scheduler 122 operable to utilize a reinforcement learning agent (RL-Agent) 123 to efficiently schedule incoming resource requests 105, e.g., jobs or services, initiated by applications on a shared compute infrastructure 130, according to some implementations. As discussed herein, the applications can be containerized, e.g., encapsulated by one or more containers, or run directly on the shared compute infrastructure or hardware. An example implementation illustrating a self-learning application scheduler in a distributed computing platform including containerized application clusters is shown and discussed in greater detail with reference to FIG. 10.

A general overview and architecture of the computing platform 100 is described in relation to FIG. 1A. Thereafter, a more detailed description of the components and processes of the self-learning application scheduler 122 are provided in relation to the subsequent figures.

As shown in the example of FIG. 1A, the computing platform 100 includes the self-learning application scheduler 122 and a shared compute infrastructure 130. In some implementations, various components of the computing platform 100 can communicate via a network (not shown). The network may be any suitable network over which computing devices can communicate. Example networks are discussed in greater detail with reference to FIG. 12. Additional or fewer systems or components are possible.

The self-learning application scheduler 122 includes an RL-Agent 123 that uses reinforcement learning to learn and encode a scheduling policy for improved application performance orchestration. More specifically, the RL-Agent 123 interacts with compute infrastructure 130 to learn an optimized policy that reduces application slowdown by taking scheduling actions $A_t$ and observing how those scheduling actions $A_t$ affect the state $S_t$ of the system. The observed state $S_t$ of the system comes with an associated reward (or penalty) when the system achieves (or does not achieve) the desirable properties, e.g., resource contention among applications, scheduling delay, etc. The RL-Agent 123 responsively adjusts the scheduling policy to maximize a future reward $R_{t+1}$ (or minimize a negative reward) which facilitates the iterative reinforcement learning process.

Indeed, at each time step t, the RL-Agent 123 observes some state $S_t$ and chooses a scheduling action $A_t$. Following the scheduling action $A_t$, the state of the environment transitions to $S_{t+1}$ and the RL-Agent 123 receives (or generates) a reward $R_{t+1}$. In some implementations, the state transitions and rewards are stochastic and are assumed to have the Markov property, i.e., the state transition probabilities and rewards depend only on the state $S_t$ of the environment and the action $A_t$ taken by the RL-Agent 123. The RL-Agent 123 can only control its scheduling actions. That is, the RL-Agent 123 has no prior knowledge of to which state the compute infrastructure 130 will transition or what reward (or penalty) may be received as a result of a particular scheduling action.

As discussed herein, the RL-Agent 123 iteratively learns a scheduling policy that maximizes the reward (or minimizes the negative reward or penalty). In some implementations, the RL-Agent 123 includes a deep neural network-based policy network and employs a standard policy gradient reinforcement learning algorithm to iteratively train the policy network to learn the optimum scheduling policy. An example illustrating the deep neural network-based policy network is shown and discussed in greater detail with reference to FIG. 3.

In some implementations, the self-learning application scheduler 122 maintains and/or generates an input space representation that is fed to the policy network of the RL-Agent 123. The input space representation can include a time-series or scheduling map of resource usage by each resource request, e.g., job or service, currently running or previously scheduled (within a threshold time period) on each of multiple compute nodes (e.g., machines) of the compute infrastructure 130 and a representation of the incoming resource requests 102 that have yet to be scheduled on the compute nodes (e.g., machines) of the compute infrastructure 130. The input space representation can be represented as an image or two-dimensional (2D) matrix with multiple 2D sub-matrices each corresponding to a time-series of resource utilization by each particular compute node of the multiple compute nodes of the compute infrastructure 130. An example input space representation is graphically shown and discussed in greater detail with reference to FIG. 5.

As discussed above, the RL-Agent 123 can employ a standard policy gradient reinforcement learning algorithm to iteratively train a deep neural network-based policy network to learn an optimum scheduling policy. An example illustrating the deep neural network-based policy network is shown and discussed in greater detail with reference to FIG. 6.

As discussed herein, the policy network comprises a neural network framework representative of the scheduling policy. The potential outputs of the neural network framework are referred to as the action space of the self-learning application scheduler 122. In some implementations, the action space is equal to the number of compute nodes (e.g., number of machines) in the compute infrastructure 130. Indeed, the self-learning application scheduler 122 learns to choose a particular compute node from the multiple compute nodes on which to schedule each incoming resource request 102, e.g., each job or service, initiated by an application.

In some implementations, the self-learning application scheduler 122 uses a penalty (negative reward) to teach the desirable properties of the system to the RL-Agent 123. For example, the total penalty can be a summation of multiple penalty components including an interference penalty, a resource over-utilization penalty, and a wait (or scheduling delay) penalty. Other or fewer reward/penalty components are possible. An example illustrating a reward/penalty calculation is shown and discussed in greater detail with reference to FIG. 7.

As discussed herein, performance interference or resource contention can slow down execution of resource requests, e.g., jobs and services, initiated by the applications. To avoid performance interference among resource requests scheduled on the same machine, an interference penalty can be computed. The interference penalty avoids scheduling resource requests together that have the same high resource usage at the same time. In some implementations, the interference penalty can be calculated by taking a cross-correlation of resource usages of a resource request with every other resource request on the same machine and then summing for all machines.

When the combined resource demands from a machine by all the co-scheduled resource requests exceed a threshold, e.g., machine's physical capacity or CPU utilization capacity, the execution of the resource requests, e.g., jobs or services, can crash the machine or severely slowdown the machine (e.g., due to memory thrashing or CPU starvation). As expected, any crash or slowdown degrades user-experience. To avoid these scenarios, the self-learning application scheduler 122 can utilize a high penalty if any of the machines are not able to meet the resource requirements of a scheduled resource request at any instance of time. This penalty is referred to as a resource over-utilization penalty and is calculated by adding a high constant factor each time a machine is unable to provide appropriate resources to scheduled resource requests.

Additionally, when the self-learning application scheduler 122 holds resource requests, e.g., jobs or services, in a wait queue for longer than a predetermined threshold period of time or duration, a resource request can miss an intended deadline (e.g., strict deadline) or degrade user-experience. Accordingly, to prevent the self-learning application scheduler 122 from holding resource requests, e.g., jobs and services, in a waiting queue for longer than a threshold period of time or duration, a constant penalty can be applied when a resource request is still in the waiting queue at the end of an iteration, e.g., time-stop or cycle of the iterative reinforcement learning process. In some implementations, the constant penalty is equal to a number of waiting resource requests in the queue multiplied by a constant (e.g., −1) at each iteration.

In some implementations, the RL-Agent 123 is bootstrapped by training it with historical time-series data (e.g., logs obtained from production containers running on a platform). The RL-Agent 123 then further learns/fine-tunes the scheduling policy once deployed in a production environment.

As shown in the example of FIG. 1A, the RL-Agent 123 acts on compute infrastructure 130 (environment or system) which can include multiple compute nodes or processing units. In some implementations, the RL-Agent 123 can be deployed and utilized within a containerized application cluster. An example illustrating deploying the RL-Agent 123 in a containerized application cluster is shown and discussed in greater detail with reference to FIG. 10.

Figure 12:
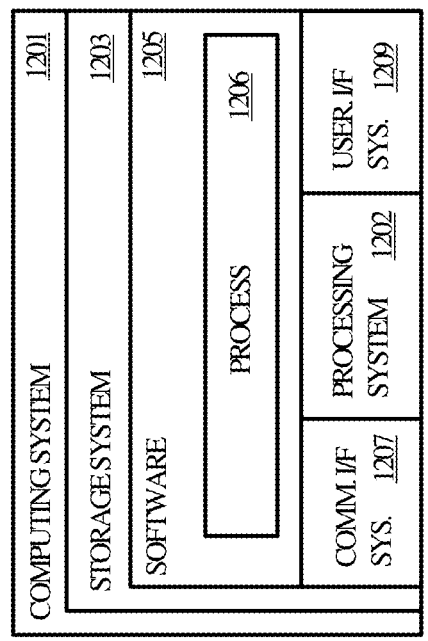
FIG. 12 depicts a block diagram illustrating an example computing system suitable for implementing the technology disclosed herein, including any of the applications, architectures, elements, processes, and operational scenarios and sequences illustrated in the Figures and discussed below in the Technical Disclosure.

The self-learning application scheduler 122 can include or be executed on any system or collection of systems configured to perform the scheduling actions discussed herein. The system or collection of systems may include server computers, blade servers, rack servers, and any other type of computing system (or collection thereof) suitable for employing the self-learning application scheduler 122 and/or otherwise carrying out the operations discussed herein. Such systems may employ one or more virtual machines, containers, or any other type of virtual computing resource in the context of improving application performance orchestration on a platform of which computing system 1201 of FIG. 12 is representative.

Figure 1B:
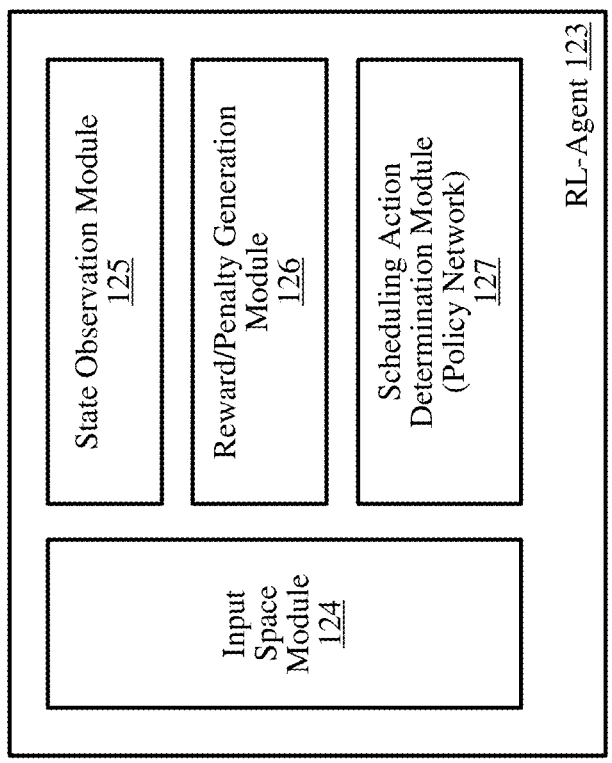
FIG. 1B depicts example components of an RL-Agent, according to some implementations.

FIG. 1B depicts example components of RL-Agent 123 of FIG. 1A, according to some implementations. The functions represented by the components, modules, managers and/or engines described with reference to FIG. 1B can be implemented individually or in any combination thereof, partially or wholly, in hardware, software, or a combination of hardware and software. Additionally, although illustrated as discrete components, the operation and functionality of the components, modules, managers and/or engines described with reference to FIG. 1B can be integrated anywhere within the self-learning application scheduler 122 and, in some implementations, partially within shared compute infrastructure 130.

As illustrated in the example of FIG. 1B, the RL-Agent 123 includes an input space module 124, a state observation module 125, a reward/penalty generation module 126 and a scheduling action determination module (policy network) 127. Other components are also possible.

The input space module 124 is configured to capture and maintain an input space representation based on observed states of the shared compute infrastructure 130. For example, the input space representation can include a time-series of resource utilization of resource requests previously scheduled on the shared compute infrastructure 130 and incoming resource requests 102 initiated by the applications. The input space module 124 feeds the input space representation to the scheduling action determination module 127 for orchestrating scheduling of the resource requests initiated by the applications on the shared compute infrastructure 130. An example input space representation is graphically shown and discussed in greater detail with reference to FIG. 5.

The state observation module 125 is configured to observe the current state of the shared compute infrastructure. The observation of the current state can be continuous, periodic, or based on other events or triggers, including combinations or variations thereof. For example, state observation module 125 may observe the state of the shared compute infrastructure 130 occurring as a result of scheduling one or more incoming resource requests on one or more machines of multiple machines of the shared compute infrastructure 130.

The reward/penalty generation module 126 is configured to calculate a reward or penalty based on the observed state of the shared compute infrastructure. For example, the reward/penalty generation module 126 can determine a change in the state of the shared compute infrastructure 130 occurring as a result of performing the scheduling action and responsively calculate a reward or penalty based on the change in state. As discussed herein, the reward or penalty can be a summation of multiple components including at least a resource contention component, a resource over utilization component, and a scheduling delay component. Other or fewer reward/penalty components are possible. An example illustrating a reward/penalty calculation is shown and discussed in greater detail with reference to FIG. 7.

The scheduling action determination module (policy network) 127 is configured to select one or more machines of multiple machines of the shared compute infrastructure 130 on which to schedule the incoming resource requests initiated by the applications based on a scheduling policy. The scheduling action determination module (policy network) 127 is further configured to iteratively learn or refine the scheduling policy based on the calculated reward or penalty to maximize an expected future reward or minimize an expected future penalty.

Figure 2:
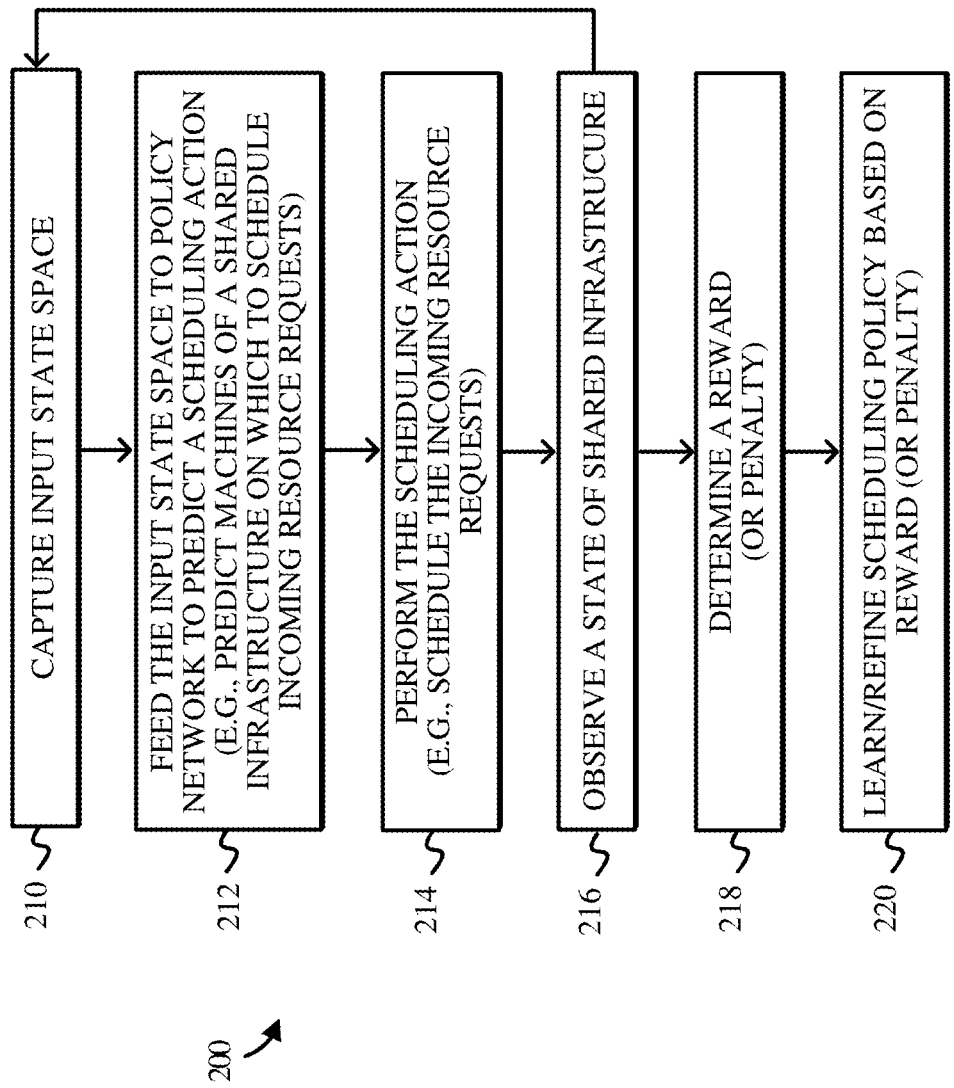
FIG. 2 depicts a flow diagram illustrating an example iterative reinforcement learning process for learning an optimum scheduling policy for improving scheduling distribution of applications on a shared compute infrastructure, according to some implementations.

FIG. 2 depicts a flow diagram illustrating an example iterative reinforcement learning process 200 for learning an optimum scheduling policy for improving scheduling distribution of resource requests initiated by applications on a shared compute infrastructure, according to some implementations. The example learning process 200 may be performed in various implementations by a self-learning application scheduler such as, for example, self-learning application scheduler 122 of FIGS. 1A and 1B, or one or more processors, modules, engines, or components associated therewith.

To begin, at 210, the self-learning application scheduler captures an input state space. As discussed herein, the input state space (or input space representation) can include or be indicative of a time-series of resource utilization of resource requests scheduled on the shared compute infrastructure and incoming resource requests initiated by the applications that are to be scheduled on the shared compute infrastructure.

In some implementations, the self-learning application scheduler maintains a representation, e.g., one or more data structures, indicative of the resource usage by each resource request (e.g., jobs or services) scheduled on each machine of compute infrastructure in addition to a representation of the incoming resource requests that have yet to be scheduled on the compute infrastructure. For example, the time-series of resource utilization can be represented as an image or 2D matrix with multiple 2D sub-matrices with each sub-matrix corresponding to the time-series of resource usage by a particular compute node over a predetermined period of timesteps or cycles. Likewise, the incoming resource requests (e.g., the requests in the incoming or wait queue) can also be represented as an image or 2D matrix.

In some implementations, the incoming resource requests are processed and stored in an incoming (waiting) queue. For example, the incoming resource requests initiated by the applications are first received and a type of each resource request of the incoming resource requests is determined. Then each incoming resource request is associated with a unique identifier or color based on the corresponding type of the resource request. For example, the unique identifier can be a floating-point number. Although not illustrated, in some implementations, the resource requests are decomposed into tasks prior to placement in the incoming (waiting) queue.

At 212, the self-learning application scheduler feeds the input space representation to a policy network that predicts a scheduling action. For example, the policy network can predict machines of a shared infrastructure on which to schedule the incoming resource requests or tasks derived therefrom. As discussed herein, the policy network can include a deep neural network configured to approximate a function dependent on one or more policy parameters that is representative of the scheduling policy. Likewise, the scheduling policy provides a probability distribution over scheduling actions given a state of the shared compute infrastructure.

As discussed herein, the input space representation can be indicative of a time-series of resource usage attributable to resource requests scheduled (e.g., currently running or scheduled within a predetermined threshold of time) on the shared compute infrastructure and incoming resource requests initiated by the applications. More specifically, the input space representation can include an image or two-dimensional matrix with multiple sub-matrices of two-dimensions corresponding to each machine of multiple machines of the shared compute infrastructure. In such instances, each sub-matrix represents the time-series of resource usage for the resource requests scheduled on the corresponding machine.

At 214, the self-learning application scheduler performs the scheduling action. More specifically, the self-learning application scheduler schedules the incoming resource requests on the predicted one or more machines of the multiple machines of the shared compute infrastructure.

At 216, the self-learning application scheduler observes a state of the shared compute infrastructure occurring as a result of scheduling the one or more incoming resource requests on the one or more selected machines. As shown, the observed state can be fed back for determination of the input space representation at the next time-step.

At 218, the self-learning application scheduler determines a reward or penalty (negative reward) based on the observed state of the shared compute infrastructure. In some implementations, the reward or penalty is a weighted combination, e.g., a summation, of multiple components including at least a resource contention component, a resource over-utilization component, and a scheduling delay component. As discussed herein, other components are also possible.

At 220, the self-learning application scheduler learns or refines the scheduling policy based on the reward (or penalty). For example, the self-learning application scheduler analyzes the reward or penalty to determine when the compute infrastructure achieves a desirable property and feeds the reward or penalty to the deep neural network to iteratively learn the scheduling policy. As noted above, the deep neural network is configured to approximate a function dependent on one or more policy parameters that is representative of the scheduling policy. In some implementations, the self-learning application scheduler iteratively learns by performing gradient-descent on the policy parameters to maximize an expected reward or minimize an expected penalty.

More specifically, the self-learning application scheduler iteratively learns by analyzing the reward or penalty to identify and encode application level characteristics of the applications in the scheduling policy. As discussed herein, among other characteristics, the application level characteristics can include time varying resource usage patterns of the resource requests, arrival patterns of the resource requests, and temporal dependencies among the resource requests.

In some implementations, the self-learning application scheduler iteratively learns by analyzing the reward or penalty to identify and encode inherent patterns and characteristics of the resource requests in the scheduling policy.

Figure 3:
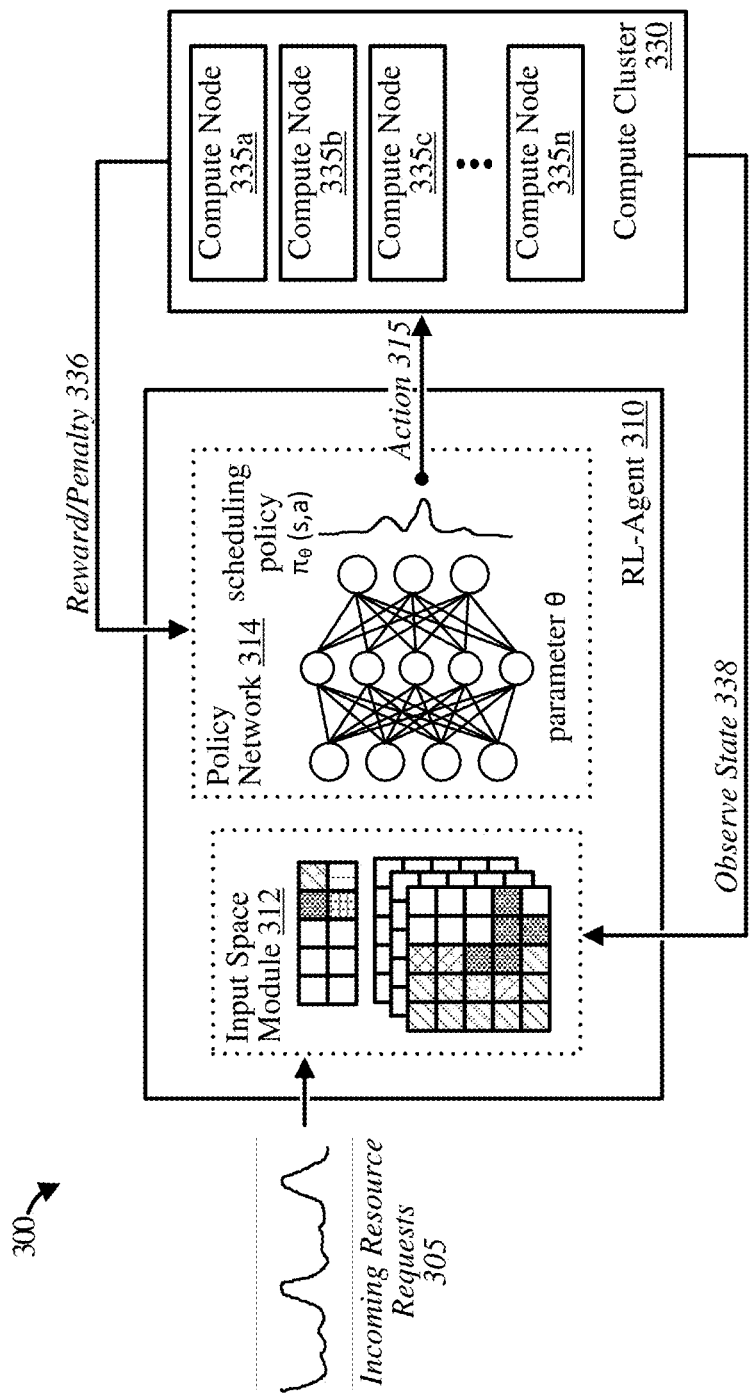
FIG. 3 depicts a block diagram illustrating an example workflow of a self-learning application scheduler including a RL-Agent operable to facilitate improved application orchestration on a platform, according to some implementations.

FIG. 3 depicts a block diagram illustrating an example workflow 300 of a self-learning application scheduler including a RL-Agent 310 operable to facilitate improved application orchestration on a platform, according to some implementations. More specifically, the RL-Agent 310 is configured to learn to improve application performance by directing the self-learning application scheduler to schedule incoming resource requests 305, e.g., jobs and services or tasks derived therefrom, in such a way that the cross-correlation of resource usage among the resource requests (i.e., the interference among resource requests) is minimized or otherwise reduced.

The RL-Agent 310 acts on or interacts with compute cluster 330. Compute cluster 330 includes multiple compute nodes 335a-335n. As discussed herein, the compute nodes 335a-335n are the processing units of a distributed computing platform on which multiple applications are deployed and executed. In some implementations, each of the compute nodes 335a-335n is representative of a machine (or virtual machine) on which tasks related to jobs or services initiated by the applications can be executed. More specifically, the RL-Agent 310 is configured to interact with compute cluster 330 to learn an optimized scheduling policy $\pi_\theta(s, a)$ by taking scheduling actions 315 (e.g., scheduling incoming resource requests 305 initiated by the applications) and observing how the scheduling actions 315 affect a state of compute cluster 330. Indeed, the RL-Agent 310 interacts with compute cluster 330 by scheduling the incoming resource requests 305 on particular compute nodes 335a-335n in the compute cluster 330. The RL-Agent 310 then observes how the scheduled resource requests affect a state of the compute cluster 330 to iteratively learn the optimized scheduling policy $\pi_\theta(s, a)$.

As shown in the example of FIG. 3, the RL-Agent 310 includes an input space module 312 and a policy network 314. The input space module 312 is configured to maintain and/or generate an input space representation of the clustered system that is fed to the policy network 314. In some implementations, the input space representation can include a time-series of resource usage by each resource request scheduled on each of the multiple compute nodes 335a-335n (e.g., virtual machines) in the compute cluster 330 and a representation of resource requests initiated by the applications that have yet to be scheduled on the compute cluster 330.

In some implementations, the input space representation can be represented as an image or 2D matrix with 2D sub-matrices corresponding to the time-series of resource utilization by the particular compute nodes of the multiple compute nodes 335a-335n. An example of an input space representation is shown and discussed in greater detail with reference to FIG. 5. As discussed herein, the input space representation is fed to the policy network 314.

The policy network 314 is configured to receive the input space representation and utilize scheduling policy $\pi_\theta(s, a)$ to recommend a scheduling action 315. As noted above, the input space representation can include a representation of incoming resource requests, e.g., jobs and services or tasks derived therefrom, initiated by applications that have yet to be scheduled on the compute cluster 330. The policy network 314 utilizes scheduling policy $\pi_\theta(s, a)$ to determine how to schedule the tasks related to the incoming resource requests. For example, the scheduling policy $\pi_\theta(s, a)$ can predict one or more compute nodes of compute nodes 335a-335n on which to schedule each of the resource requests. As discussed herein, each resource request can comprise a job or a service that can include one or more tasks to be performed by the compute node once scheduled.

The policy network 314 then utilizes a reward/penalty 336 to determine when the clustered system achieves (or does not achieve) a desirable clustered system property, e.g., resource contention among applications, scheduling delay, etc. As discussed herein, the policy network 314 attempts to maximize the received reward (or minimize the received penalty) to iteratively learn the optimized scheduling policy $\pi_\theta(s, a)$. For example, a reward (or penalty) results when the system achieves (or does not achieve) a desirable system property (e.g., resource contention among applications, scheduling delay, etc.). An example illustrating generation of a penalty is shown and discussed in greater detail with reference to FIG. 7.

In some implementations, the policy network 314 can be a neural network framework that is representative of the scheduling policy $\pi_\theta(s, a)$. The scheduling policy $\pi_\theta(s, a)$ can represent a function that is dependent on one or more policy parameters. As shown in the example of FIG. 3, parameter θ can be adjusted based on the received reward (or penalty). In some implementations, the RL-Agent 310 employs a standard policy gradient reinforcement learning algorithm and uses a deep neural network to train the policy network 314 to learn the optimum scheduling policy $\pi_\theta(s, a)$. An example illustrating a deep neural network configured to approximate a function representative of the scheduling policy $\pi_\theta(s, a)$ is shown and discussed in greater detail with reference to FIG. 6.

Figure 4:
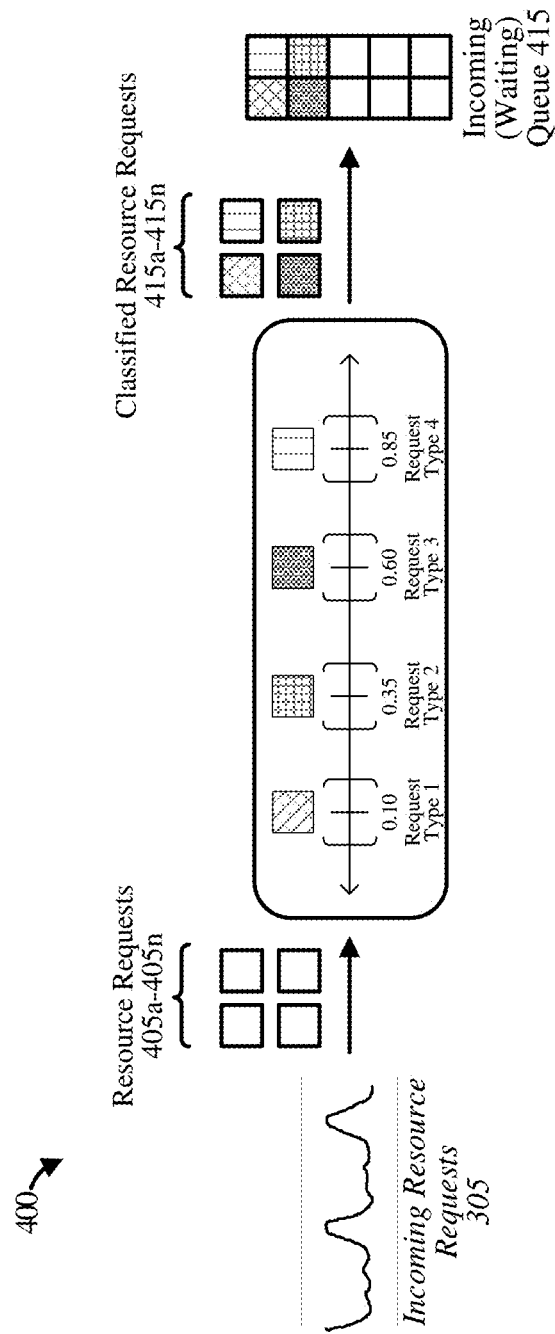
FIG. 4 depicts a diagram illustrating an example workflow demonstrating operation of a self-learning application scheduler for classifying resource requests, according to some implementations.

FIG. 4 depicts a diagram illustrating an example workflow 400 demonstrating operation of a self-learning application scheduler for classifying resource requests 405a-405n, according to some implementations. More specifically, the example of FIG. 4 illustrates operation of an RL-Agent of a self-learning application scheduler or one or more processors, modules, engines, or components associated therewith. The RL-Agent can be RL-Agent 310 of FIG. 3, although alternative configurations are possible.

As shown in the example of FIG. 4, the RL-Agent receives incoming resource requests 305 initiated by applications on a distributed computing platform and responsively identifies a particular type of each of the resource requests 405a-405n. The RL-Agent then assigns the resource request a unique identifier based on the type of the resource request resulting in classified resource requests 415a-415n. In some implementations, a unique color or floating-point number between (0,1) can be assigned to each different resource request. As shown in the example of FIG. 4, different pattern fills represent different types of resource requests, e.g., the different pattern fills represent different colors or floating-point numbers.

In some implementations, the floating-point numbers assigned to each resource request type are substantially separated between different types in order to handle and distinguish multiple instances of the same type that might be running on the same machine at the same time. For example, multiple resource requests of the same type can be assigned unique floating-point numbers that are close in value to a pre-determined floating-point number for a given type of resource request. By way of example, FIG. 4 illustrates 'Resource Type 1' with a pre-determined value '0.10', 'Resource Type 2' with a pre-determined value '0.35', 'Resource Type 3' with a pre-determined value '0.60', and 'Resource Type 4' with a pre-determined value '0.85'. Indeed, to handle and distinguish multiple instances of a same resource request type that might be running on a same machine at the same time, a different floating-point number is assigned to each type that is close in value to the pre-determined value for the type of resource request, e.g., 0.09, 0.10, and 0.11 for tasks of 'Resource Type 1'. The floating-point numbers are on a continuous scale.

Figure 5:
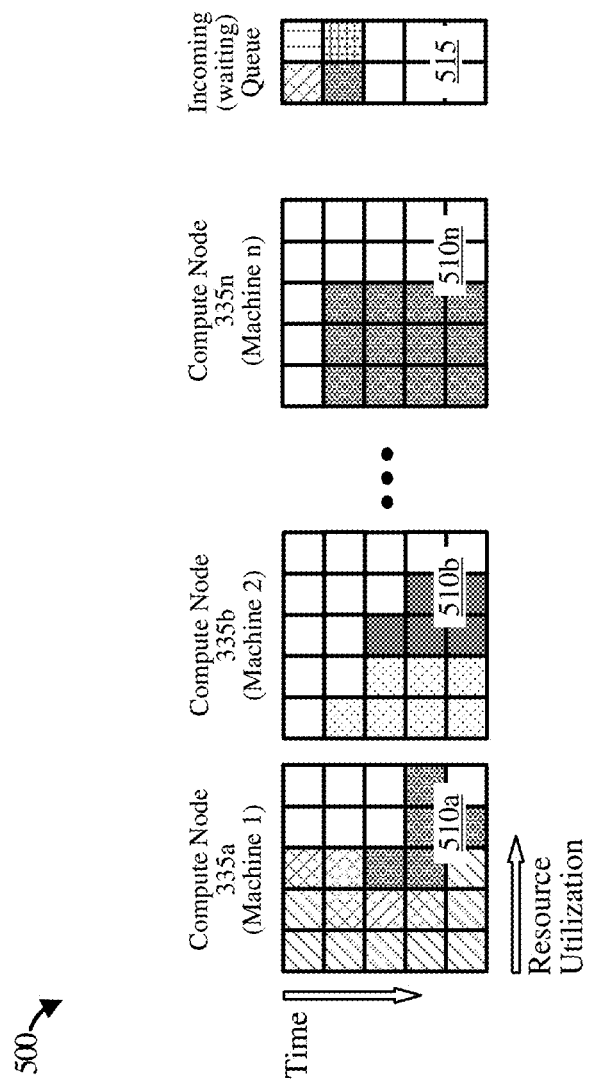
FIG. 5 depicts a block diagram illustrating an example input state space representation that is fed to a policy network, according to some implementations.

FIG. 5 depicts a block diagram illustrating an example input state space (also referred to herein as input space) representation 500 that is fed to a policy network, according to some implementations. More specifically, the input space recommendation 500 depicts a time-series of resource usage on each of the multiple compute nodes 335a-335n (e.g., machines) in the compute cluster 330 of FIG. 3 and a representation of the incoming resource requests, e.g., incoming jobs or services or tasks derived therefrom, that have yet to be scheduled in the compute cluster 330. As discussed herein, the input space representation 500 can be fed to policy network 314 of FIG. 3.

As shown in the example of FIG. 5, the input space representation 500 includes 2D matrices 510a-510n representing the time-series of resource utilization for corresponding compute nodes 335a-335n, respectively. The input space representation also includes a 2D matrix 515 representing the incoming resource requests that have yet to be scheduled in the compute cluster 330. As discussed with respect to FIG. 4, different pattern fills represent different colors or floating-point numbers assigned to particular resource requests.

As discussed above, each of the 2D matrices 510a-510n represent the time-series of resource utilization for a corresponding compute node of compute nodes 335a-335n. More specifically, for each machine, one dimension represents resource usage (or utilization) by the resource requests, e.g., jobs or services or tasks derived therefrom, scheduled on the machine. Although not shown, the resource usage is bounded by the capacity of the machine R. Indeed, each compute node 335a-335n has a total physical resource capacity R. In some implementations, the total resource capacity R can vary from machine to machine. The other dimension of the 2D matrices represents resource usage for last "T" timesteps. Indeed, the time-dimension captures the temporal variations of the resource usage patterns for the scheduled tasks over time. The input space also captures a pattern of resource requests through an incoming (or waiting) queue 515. As discussed herein, each element in the incoming (or waiting) queue 515 represents a resource request, or task derived therefrom, that is yet to be scheduled along with its associated color or assigned floating-point number.

Figure 6:
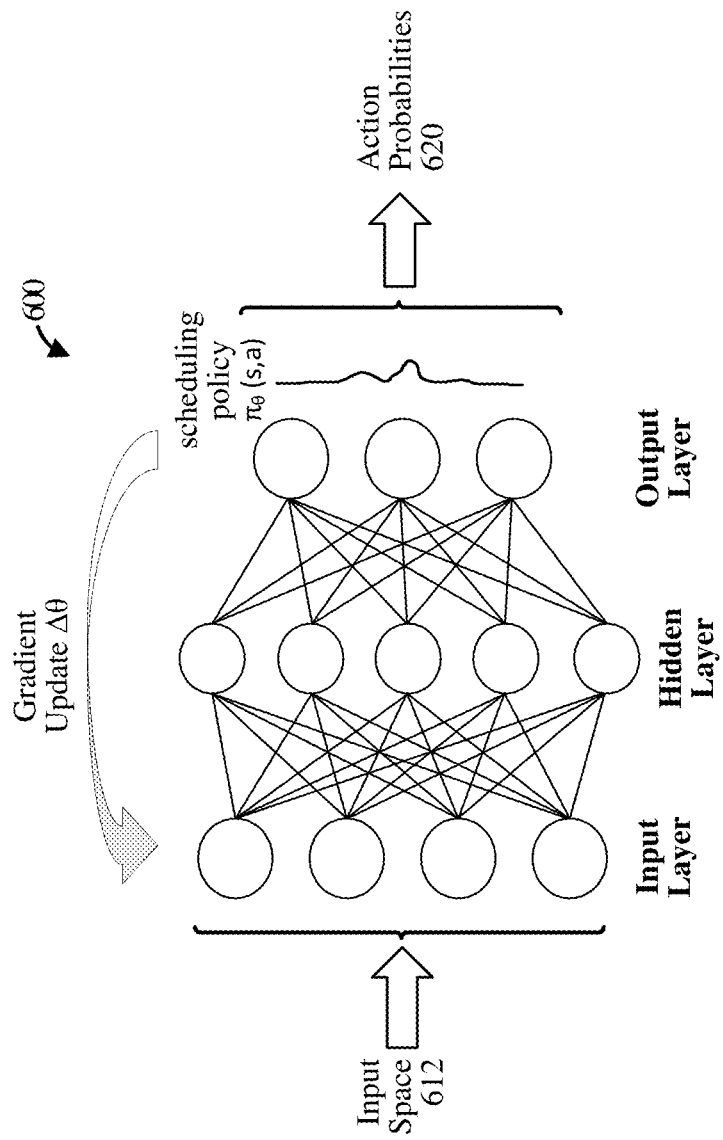
FIG. 6 depicts a block diagram illustrating an example implementation of an RL-Agent using a deep neural network to approximate a function representative of a scheduling policy $\pi_\theta(s, a)$, according to some implementations.

FIG. 6 depicts a block diagram illustrating an example deep neural network 600 configured to approximate a function representative of a scheduling policy $\pi_\theta(s, a)$, according to some implementations. More specifically, the example of FIG. 6 depicts a standard policy gradient reinforcement learning algorithm using a deep neural network to train a policy network of an RL-Agent to iteratively learn an optimum scheduling policy $\pi_\theta(s, a)$.

As discussed herein, the RL-Agent 310 interacts with compute cluster 330. Indeed, at a time t, the RL-Agent 310 is in a state $s_t$ and, based on scheduling policy $\pi_\theta(s, a)$, the RL-Agent decides to take an action $a_t$. The RL-Agent then moves to a state $s_{t+1}$ and gets a reward $r_t$. The RL-Agent 310 has no prior knowledge of to which state the system will transition or what reward (or penalty) may be received as a result of an action. That is, the state transitions are generally Markovian, i.e., the transition probabilities depend only on the current state $s_{t+1}$ and not the path followed.

Continuing with the example of FIG. 6, the objective of training the policy network is to maximize the cumulative expected discounted reward: $E[\Sigma_{t=0}^{\infty} \gamma^t r_t]$, where $\gamma \epsilon (0,1]$ determines how the future rewards contribute to the total reward. The RL-Agent 310 takes actions 315 based on a scheduling policy $\pi_\theta(s, a)$. In some implementations, the scheduling policy $\pi_\theta(s, a)$ is a probability distribution over actions given a state s. Indeed, $\pi_\theta(s, a)$ denotes the probability for the action a (or action probabilities 620) when in state s. In typical scenarios, the state space and/or action space is quite large, making it impossible to store a table for each value of s and a. Thus, as shown in the example of FIG. 6, a function approximator for the scheduling policy $\pi_\theta(s, a)$ is represented by a deep neural network 600.

The deep neural network 600 includes an input layer, one or more hidden layers, and an output layer. Each layer can be fully connected. The potential outputs of the neural network framework are referred to as the action space for the self-learning application scheduler. In some implementations, the action space is equal to the number of compute nodes 335a-335n, e.g., number of machines in the compute cluster 330. Indeed, given a state s, the AL-Agent 310 provides action probabilities 620 from which the self-learning application scheduler selects particular compute nodes from the compute nodes 335a-335n on which to schedule each incoming resource request, e.g., job or service, initiated by a application.

In some implementations, the reinforcement learning algorithm of the RL-Agent learns by performing gradient-descent on the scheduling policy $\pi_\theta(s, a)$ parameters to maximize the expected cumulative discounted reward. Indeed, the gradient is given by Equation 1:

$$\Delta_\theta E_{\pi_\theta}[\Sigma_{t=0}^{\infty} \gamma^t r_t] = E_{\pi_\theta}[\Delta_\theta \log \pi_\theta(s,a) Q^{\pi_\theta}(s,a)] \quad (1)$$

where $Q^{\pi_\theta}(s, a)$ is the expected cumulative discounted reward from (deterministically) choosing action a in state s, and subsequently following scheduling policy $\pi_\theta(s, a)$.

Indeed, the policy gradient method is operable to estimate the gradient by observing the trajectories of executions that are obtained by following the scheduling policy $\pi_\theta(s, a)$. In some implementations, a Monte Carlo method can be utilized where the RL-Agent 310 samples multiple trajectories and uses the empirically computed cumulative discounted reward, $v_t$, as an unbiased estimate of $Q^{\pi_\theta}(s_t, a_t)$. The RL-Agent 310 then updates the policy parameters via gradient descent as given by Equation 2:

$$\theta = \theta + \alpha \Sigma_t \log \pi_\theta(s_t, a_t) v_t, \text{ where } \alpha \text{ is the step size} \quad (2)$$

In some implementations, the RL-Agent uses the following modified REINFORCE algorithm to solve the optimization problem in order to train the agent:

--- for each iteration:
  $\Delta_\theta := 0$
  run trajectories from i = 1 to N:
    $\{s_1^i, a_1^i, r_1^i, \ldots s_{L_i}^i, a_{L_i}^i, r_{L_i}^i\}$
  compute discounted rewards: $v_t^i = \Sigma_{s=t}^{L_i} \gamma^{s-t} r_s^i$
  for t = 1 to N:

$$\text{compute mean baseline: } b_t = \frac{1}{N} \sum_{i=1}^{N} v_t^i$$

for i = 1 to N:
      compute gradients: $\Delta_\theta = \Delta_\theta + \alpha \log \pi_\theta(s_t^i, a_t^i)(v_t^i - b_t^i)$
    end
  end
  update policy parameters: $\theta = \theta + \Delta_\theta$
end

--- where $L_i$ is the finished episode length for the $i^{th}$ episode. The algorithm estimates the policy gradient using Equation 2.

Figure 7:
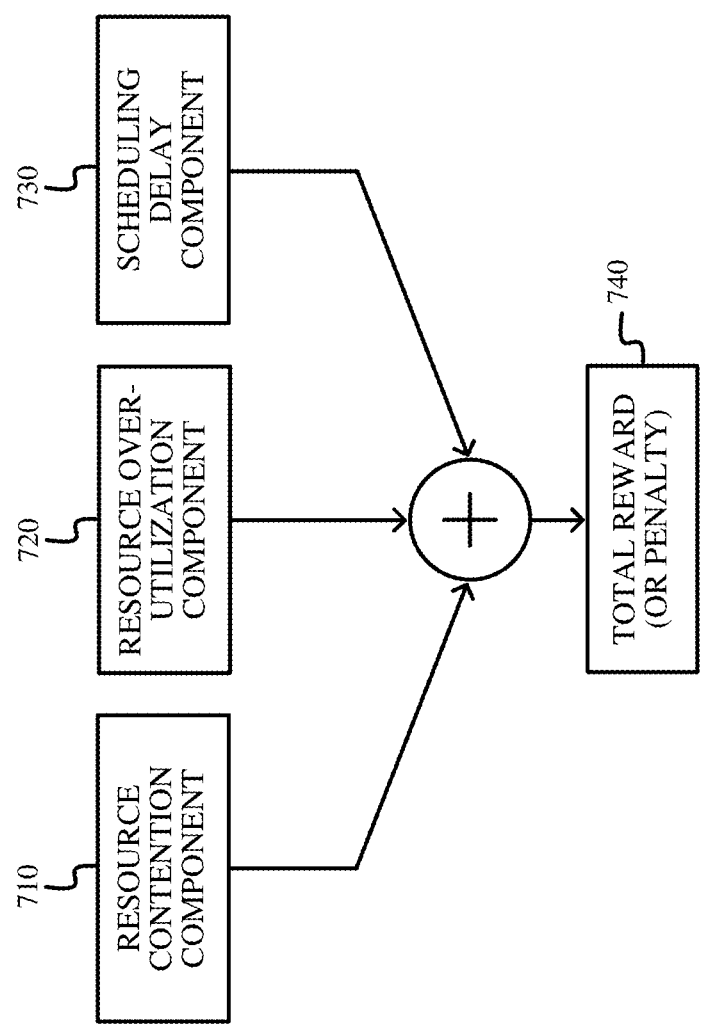
FIG. 7 depicts a block diagram illustrating example operations for generating a reinforcement learning based reward or penalty, according to some embodiments.

FIG. 7 depicts a block diagram illustrating example operations for generating a reinforcement learning based reward or penalty (negative reward) to teach an RL-Agent desirable properties of the system, according to some embodiments. More specifically, the example of FIG. 7 illustrates calculating a total reinforcement learning based penalty (negative reward) 740 defined by the combination of a resource contention component 710, a resource over-utilization component 720, and a scheduling delay (or wait) component 730. As discussed herein, the reinforcement learning based reward or penalty (negative reward) can have alternative configurations. Additionally, in some implementations, weights can be provided or adjusted to afford more or less weight to any of the individual penalty components.

As shown in the example of FIG. 7, the resource contention component 710 is a penalty designed to avoid interference among resource requests scheduled on the same machine, e.g., the cross-correlation of resource usage. This type of penalty attempts to avoid scheduling resource requests together which have the same high resource usage at the same time. The resource contention component 710 is calculated by taking cross correlation of resource usages of a resource request with every other resource request on the same machine (or compute node) and summing the cross correlation of resource usages for each machine. An example cross-correlation calculation can be calculated as follow:

$$\sum_{VM} \left\{ \sum_{\substack{i,j \in VM \\ i \neq j}} \text{cross\_correlation}(i, j) \right\}$$

More specifically, the resource contention component 710 computes a cross-correlation between any two resource requests i and j that are running on the same machine (or virtual machine) as follows:

$$\text{cross\_correlation}(i, j) = \sum_{t=0}^{min(T_i, T_j)} \text{resource\_usage}(i, t) * \text{resource\_usage}(j, t)$$

where $T_i$ is the length of the task i and the resource_usage (i, t) is the instantaneous resource demand by resource request i at time t.

The resource over-utilization component 720 is a penalty designed to prevent scheduling of more resource requests than can be handled by a machine. More specifically, the resource over-utilization component 720 introduces a penalty when a machine is not able to meet the resource requirements of resource requests scheduled on that machine. In some implementations, the resource over-utilization component 720 is calculated by adding a high constant factor each time a machine is unable to provide appropriate resources to the running (or executing) resource requests.

The scheduling delay (or wait) penalty component 730 is a penalty designed to prevent holding incoming resource requests, e.g., incoming jobs or services or tasks derived therefrom, in the incoming (or waiting) queue for longer than a threshold period of time. Indeed, the wait penalty component 730 introduces a constant penalty when a resource request is held in the waiting queue rather than being scheduled on one of the machines in the compute cluster. In some implementations, the penalty is equal to the number of waiting tasks in the queue multiplied by a pre-determined constant (e.g., −1) at each timestep or cycle.

In some implementations, additional reward or penalty components can be utilized or included with one or more of the other rewards or penalties. For example, an under-utilization penalty can be used to maximize utilization of the compute cluster (or machines of the compute cluster). For example, the under-utilization penalty can be designed to minimize a total number of machines that are utilized. Indeed, the penalty for handling this constraint is proportional to sum of unused resources in used machines.

Figure 8:
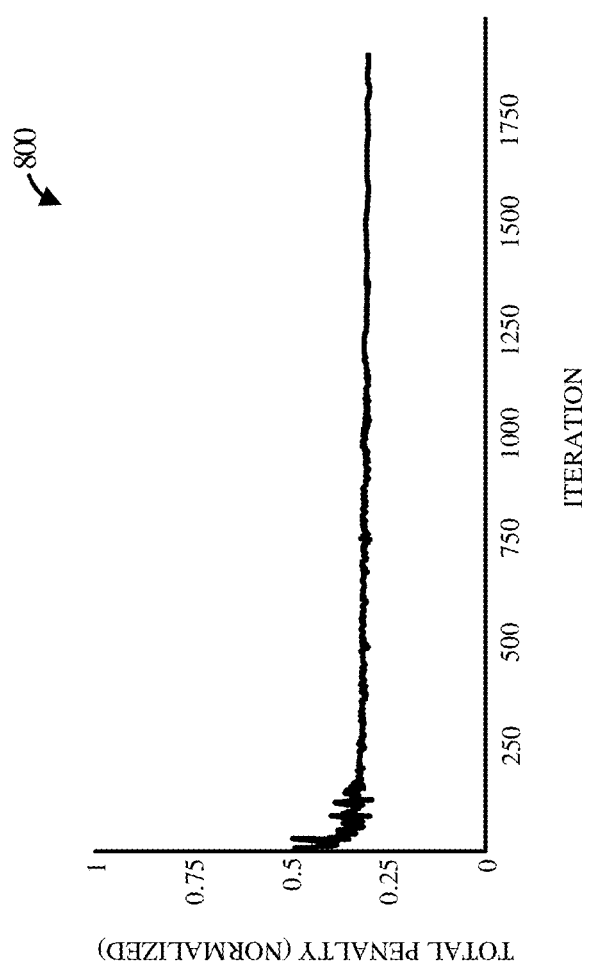
FIG. 8 depicts a graphical diagram illustrating example experimental results of a policy network that learns to converge a penalty (or negative reward) with iterations, according to some implementations.

FIG. 8 depicts a graphical diagram 800 illustrating example experimental results of a policy network that learns to converge a penalty (or negative reward) with iterations, according to some implementations. More specifically, the example of FIG. 8 illustrates how a desirable convergence can be achieved by the policy network of a self-learning application scheduler. The policy network can be policy network 314 of FIG. 3, although alternative configurations are possible. As shown in graphical diagram 800, a desirable convergence is achieved after a number of iterations, e.g., 1500 iterations.

In some implementations, the self-learning application scheduler is bootstrapped by training it using historical time-series data (e.g., logs obtained from production containers running on a platform). Once the initial training is completed, the self-learning application scheduler can be deployed in the platform and fine-tuned via iterative reinforcement-based learning as discussed herein. For example, simulations based on real production traces obtained from production clusters (e.g., ETHOS production clusters) can be used to bootstrap training the self-learning application scheduler. More specifically, for each resource request an RL-Agent of the self-learning application scheduler uses a time-series of resource utilization logs of actual resource requests, e.g., jobs or services. As discussed herein, there can be multiple instances of each resource type. For each epoch, the RL-Agent constructs multiple sequences of these resource requests. These sequences are generated based on characteristics of arrival pattern of each resource type such as, for example, frequency, how many instances of the resource requests arrive concurrently, etc.

An example workload sequence generation algorithm follows:

```
workload = empty sequence
max_jen = MAX_SEQ_LEN
for time = 0 to T_MAX:
  for each task_type:
    if (time % period(task_type)) == 0:
      cur_workload = task_type * random(1, num_instances(task_type))
      shuffle(cur_workload)
      workload = workload + cur_workload
    if len(workload) > max_len:
      return workload[:max_len]
``` wherein the functions are defined as follows:

```
period(task_type): return period of given task type
num_instances(task_type): return how many instances of the given
    task_type come at a time
shuffle(sequence): shuffles the sequence
```

In some implementations, for each epoch, the RL-Agent generates M distinct resource request sequences from the above function for training and runs N episodes for each resource request sequence. Each episode is allowed to run for a maximum of max_episode_length time steps.

Figure 9:
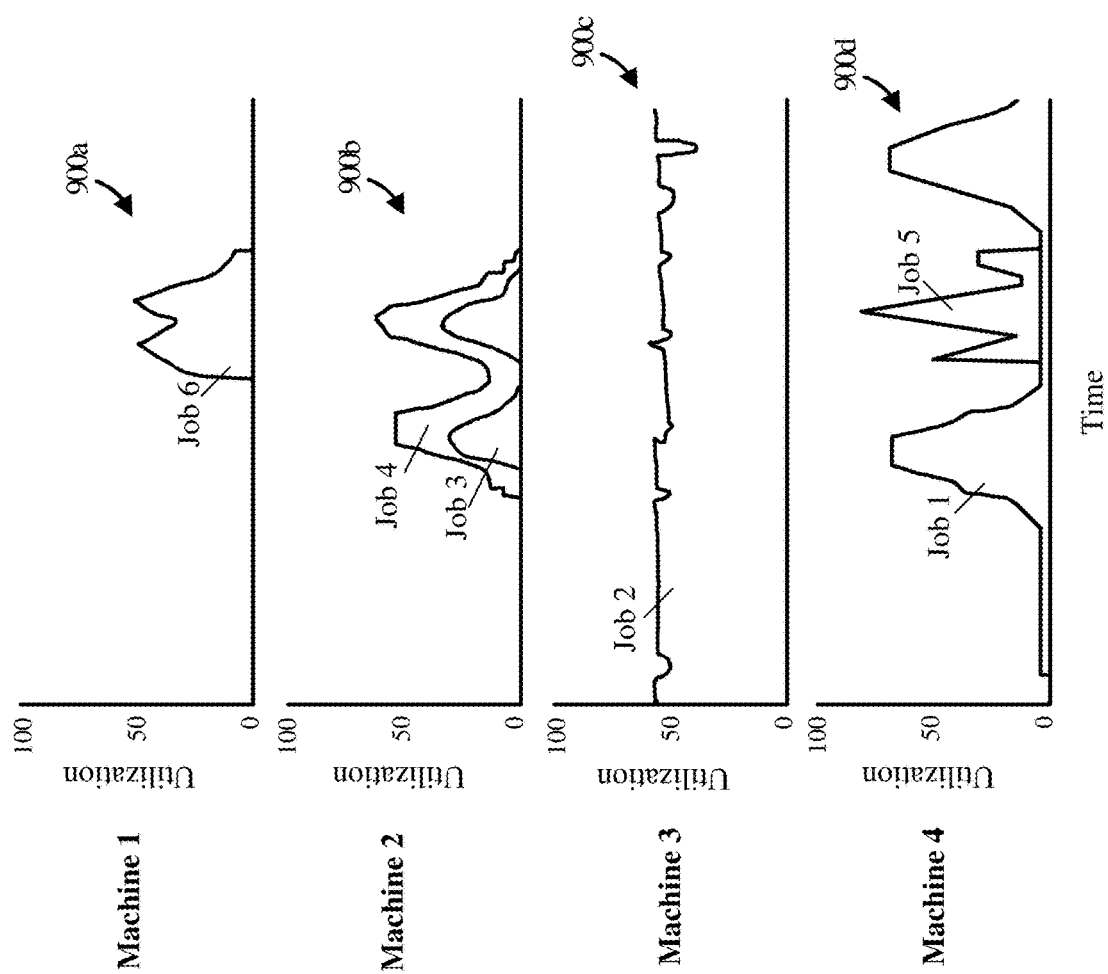
FIG. 9 depicts graphical diagrams illustrating example scheduling decisions made by a self-learning application scheduler, according to some implementations.

FIG. 9 depicts graphical diagrams 900a-900d illustrating example scheduling decisions made by a self-learning application scheduler, according to some implementations. More specifically, the example of FIG. 9 depicts effective scheduling of resource requests, e.g., jobs or tasks derived therefrom, by understanding resource usage and arrival patterns of the jobs. The self-learning application scheduler can be self-learning application scheduler 122 of FIGS. 1A and 1B, although alternative configurations are possible.

As shown in the example of FIG. 9, the self-learning application scheduler's scheduling strategy differs from scheduling strategies that try to schedule an incoming job on the least utilized machine that can accommodate a historical resource peak demand of the job or wait until any one of the machines become available to accommodate the historical resource peak demand of the job. For example, when Job-4 arrives, instead of assigning the job on empty Machine-1, the self-learning application scheduler schedules it on an already occupied Machine-2 as the self-learning application scheduler anticipates that this scheduling will reduce future cross-correlation of resource demands among the competing jobs.

Similarly, the self-learning application scheduler is able to schedule Job-5 in the valley between two peaks of Job-1 on Machine-4 as it predicted that Job-5 will complete before the second peak of Job-1 arrives and, thus, the overall cross-correlation is improved over other alternatives, e.g., where Job-5 is scheduled on Machine-1 and Job-6 is scheduled on Machine-4.

Figure 10:
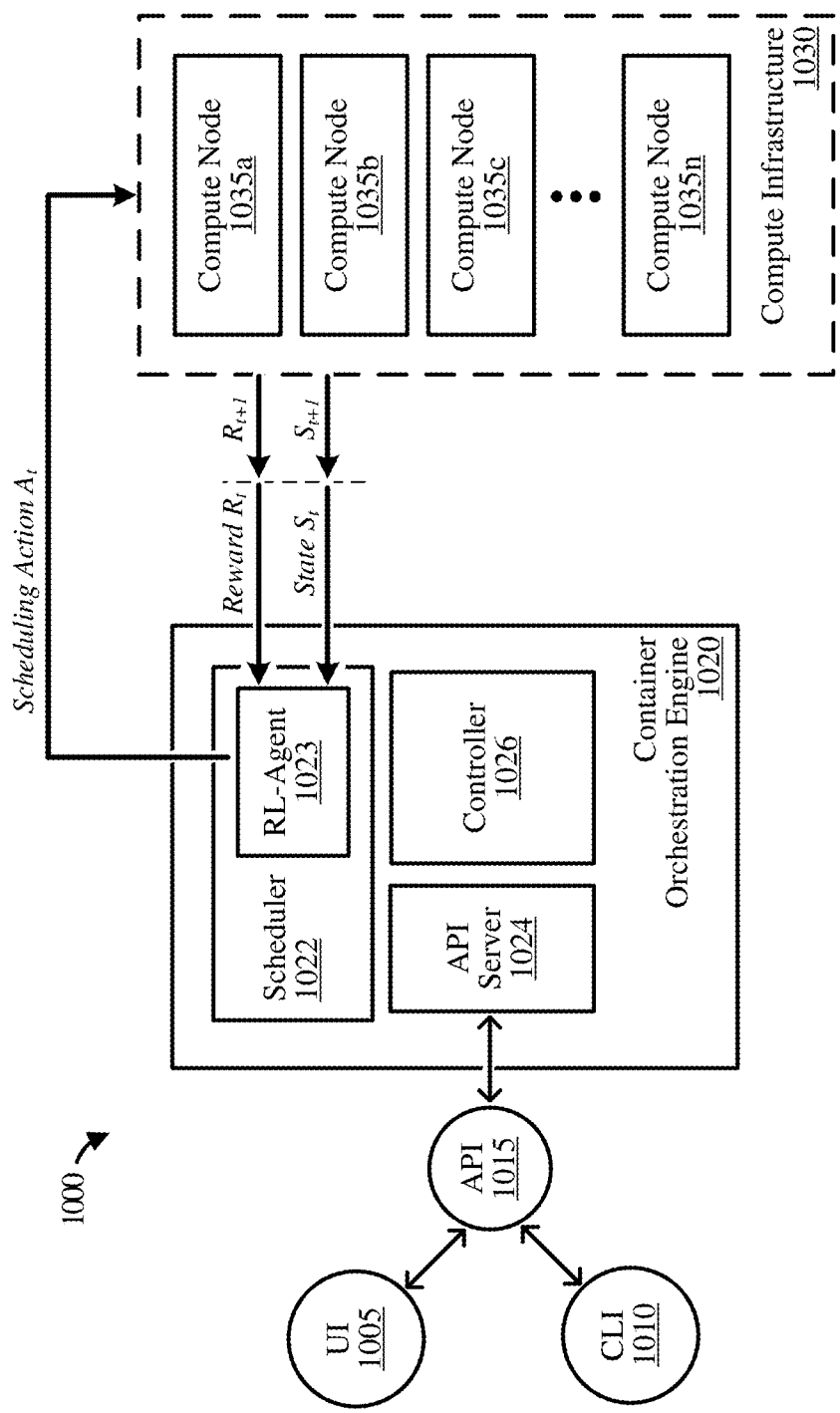
FIG. 10 depicts a block diagram illustrating an example distributed computing platform including a self-learning application scheduler operable to utilize an RL-Agent to efficiently schedule resource requests initiated by applications on a shared computing platform, according to some implementations.

FIG. 10 depicts a block diagram illustrating an example distributed computing platform 1000 including a self-learning application scheduler 1022 operable to utilize an RL-Agent 1023 to efficiently schedule resource requests, e.g., jobs or services or tasks derived therefrom, initiated by applications on platform 1000, according to some implementations. As shown in the example of FIG. 10, the example distributed computing platform 1000 can be representative of a single containerized application cluster. However, in some implementations, the distributed computing platform 1000 can include multiple containerized application clusters, each having the same or a different configuration.

As shown in the example of FIG. 10, the distributed computing platform 1000 includes user interface (UI) 1005, command line interface (CLI) 1010, application program interface (API) 1015, container orchestration engine 1020, and a shared compute infrastructure 1030. In some implementations, various components of the distributed computing platform 1000 can communicate via a network (not shown). The network may be any suitable network over which computing devices can communicate. Example networks are discussed in greater detail with reference to FIG. 12. Additional or fewer systems or components are possible.

The example distributed computing platform 1000 can be representative of a containerized application cluster consisting of at least one master node, e.g., container orchestration engine 1020, and multiple compute nodes, e.g., compute nodes 1035a-1035n. In such instances, each compute node executes a container runtime along with an agent that communicates with the master. The nodes may also execute additional components for logging, monitoring, service discovery and optional add-ons. As discussed herein, the compute nodes 1035a-1035n are the processing units of the cluster and can expose compute, networking and storage resources to applications. In some implementations, the compute nodes 1035a-1035n can be virtual machines (VMs) running in a cloud or bare metal servers running within a data center.

Continuing with the example of FIG. 10, the container orchestration engine 1020 includes the self-learning application scheduler 1022, an API server 1024, and a controller 1026. The orchestration engine 1020 can expose API 1015 via the API server 1024, perform scheduling via the self-learning application scheduler 1022, and manage the applications on the cluster via controller 1026. Indeed, controller 1026 can facilitate control and coordination of clusters including deployment, automate updates, health monitoring, failover procedures, etc. Likewise, jobs, services and other communications can be transmitted and received via UI 1005 and CLI 1010.

As discussed above, the self-learning application scheduler 1022 includes an RL-Agent 1023 that uses reinforcement learning to learn and encode a scheduling policy for improved application performance orchestration. For example, the RL-Agent 1023 interacts with compute infrastructure 1030 to learn an optimized policy that reduces application slowdown by taking scheduling actions $A_t$ and observing how those scheduling actions $A_t$ affect the state $S_t$ of the system. The observed state $S_t$ of the system comes with an associated reward (or penalty) when the system achieves (or does not achieve) the desirable properties, e.g., resource contention among applications, scheduling delay, etc. The RL-Agent 1023 responsively adjusts the scheduling policy to maximize a future reward $R_{t+1}$ (or minimize a negative reward) which facilitates the iterative reinforcement learning process.

Indeed, at each time step t, the RL-Agent 1023 observes some state $S_t$ and chooses a scheduling action $A_t$. Following the scheduling action $A_t$, the state of the environment transitions to $S_{t+1}$ and the RL-Agent 1023 receives (or generates) a reward $R_{t+1}$. In some implementations, the state transitions and rewards are stochastic and are assumed to have the Markov property, i.e., the state transition probabilities and rewards depend only on the state $S_t$ of the environment and the action $A_t$ taken by the RL-Agent 1023. The RL-Agent 1023 can only control its scheduling actions. That is, the RL-Agent 1023 has no prior knowledge of to which state the system (compute infrastructure 1030) will transition or what reward (or penalty) may be received as a result of an action.

As discussed herein, the RL-Agent 1023 iteratively learns a scheduling policy that maximizes the reward (or minimizes the negative reward). In some implementations, the RL-Agent 1023 employs a standard policy gradient reinforcement learning algorithm and uses a deep neural network based RL-agent 1023 to train a policy network that learns the optimum scheduling policy. An example illustrating the deep neural network based RL-agent 1023 and policy network is shown and discussed in greater detail with reference to FIG. 3.

In some implementations, the self-learning application scheduler 1022 maintains and/or generates a scheduling map or other data structure(s) of the resource requests (e.g., jobs or services) currently running or previously scheduled on each machine of compute infrastructure 1030 in addition to the incoming resource requests that have yet to be scheduled on the compute infrastructure 1030. For example, the self-learning application scheduler 1022 can maintain a time-series of resource usage by each resource request scheduled on each of the multiple compute nodes 1035a-1035n (e.g., machines) of the compute infrastructure 1030.

As discussed herein, the self-learning application scheduler 1022 can maintain and/or generate an input space representation that is fed to the policy network of the RL-Agent. The input space representation can include a time-series or scheduling map of resource usage by each resource request, e.g., job or service, currently running or previously scheduled (within a threshold time period) on each of the multiple compute nodes 1035a-1035n (e.g., machines) in the compute infrastructure 1030 and a representation of the incoming resource requests that have yet to be scheduled on the compute nodes 1035a-1035n of the compute infrastructure 1030. In some implementations, the input space representation can be represented as an image or two-dimensional (2D) matrix with multiple 2D sub-matrices each corresponding to a time-series of resource utilization by each particular compute node of the multiple compute nodes 1035a-1035n of the compute infrastructure 1030. An example input space representation is graphically shown and discussed in greater detail with reference to FIG. 5.

As discussed above, the RL-Agent 1023 can employ a standard policy gradient reinforcement learning algorithm to iteratively train a deep neural network-based policy network to learn an optimum scheduling policy. An example illustrating the deep neural network-based policy network is shown and discussed in greater detail with reference to FIG. 6.

As discussed herein, the policy network comprises a neural network framework representative of the scheduling policy. The potential outputs of the neural network framework are referred to as the action space of the self-learning application scheduler 1022. In some implementations, the action space is equal to the number of compute nodes 1035a-1035n (e.g., number of machines) in the compute infrastructure 1030. Indeed, the self-learning application scheduler 1022 learns to choose a particular compute node from the compute nodes 1035a-1035n on which to schedule each incoming resource request, e.g., job or service, initiated by an application.

In some implementations, the self-learning application scheduler 1022 uses a penalty (negative reward) to teach the desirable properties of the system to the RL-Agent 1023. For example, the total penalty can be a summation of multiple penalty components including an interference penalty, a resource over-utilization penalty, and a wait (or scheduling delay) penalty. Other or fewer reward/penalty components are possible. An example illustrating a reward/penalty calculation is shown and discussed in greater detail with reference to FIG. 7.

As discussed herein, performance interference or resource contention can slow down execution of resource requests, e.g., jobs and services, initiated by the applications. To avoid performance interference among resource requests scheduled on the same machine, an interference penalty can be computed. The interference penalty avoids scheduling resource requests together that have the same high resource usage at the same time. In some implementations, the interference penalty can be calculated by taking a cross-correlation of resource usages of a resource request with every other resource request on the same machine and then summing for all machines.

When the combined resource demands from a machine by all the co-scheduled resource requests exceed a threshold, e.g., machine's physical capacity or CPU utilization capacity, the execution of the resource requests, e.g., jobs or services, can crash the machine or severely slowdown the machine (e.g., due to memory thrashing or CPU starvation). Any crash or slowdown degrades user-experience. To avoid these scenarios, the self-learning application scheduler 1022 can utilize a high penalty if any of the machines are not able to meet the resource requirements of a scheduled resource requests at any instance of time. This penalty is referred to as a resource over-utilization penalty and is calculated by adding a high constant factor each time a machine is unable to provide appropriate resources to scheduled resource requests.

Additionally, when the self-learning application scheduler 1022 holds resource requests, e.g., jobs or services, in a wait queue for longer than a predetermined threshold period of time or duration, a resource request can miss an intended deadline (e.g., strict deadline) or degrade user-experience. Accordingly, to prevent the self-learning application scheduler 1022 from holding resource requests, e.g., jobs and services, in a waiting queue for longer than a threshold period of time or duration, a constant penalty can be applied when a resource request is still in the waiting queue at the end of an iteration, e.g., time-stop or cycle of the iterative reinforcement learning process. In some implementations, the constant penalty is equal to a number of waiting resource requests in the queue multiplied by a constant (e.g., $-1$) at each iteration.

As shown in the example of FIG. 10, the RL-Agent 1023 acts on compute infrastructure 1030 (environment or system). Compute infrastructure 1030 includes multiple compute nodes 1035a-1035n. The compute nodes 1035a-1035n are the processing units of the cluster. In some implementations, the compute infrastructure 1030 can be a cluster consisting of the multiple compute nodes 1035a-1035n where each compute node is representative of a machine (or virtual machine) on which the containerized applications can be deployed and executed. Although not illustrated in the example of FIG. 10, each such machine has a total physical resources capacity.

The container orchestration engine 1020 can include or be executed on any system or collection of systems configured to expose API 1015, perform scheduling, and generally manage the containerized applications on the cluster. The system or collection of systems may include server computers, blade servers, rack servers, and any other type of computing system (or collection thereof) suitable for employing the self-learning application scheduler 1022 and/or otherwise carrying out the operations discussed herein. Such systems may employ one or more virtual machines, containers, or any other type of virtual computing resource in the context improving application performance orchestration on a platform of which computing system 1201 of FIG. 12 is representative.

As discussed herein, the container orchestration engine 1020 and each compute node 1035a-1035n can be deployed or hosted on a shared physical infrastructure (or servers) in various configurations. Example deployment configurations are shown and discussed in greater detail with reference to FIGS. 11A and 11B.

Figure 11A:
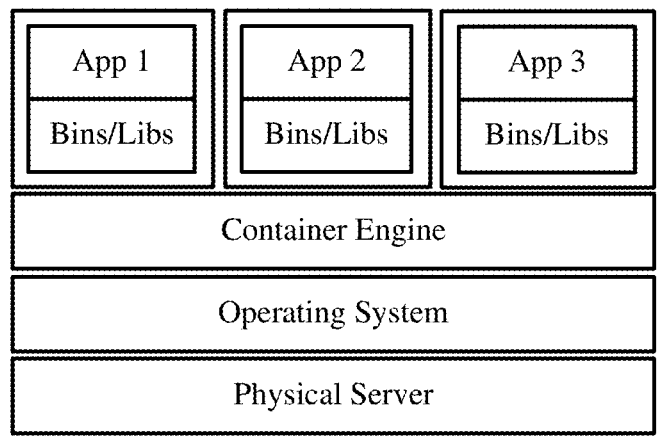
FIGS. 11A and 11B depict block diagrams illustrating example application platform deployments, according to some implementations.
Figure 11B:
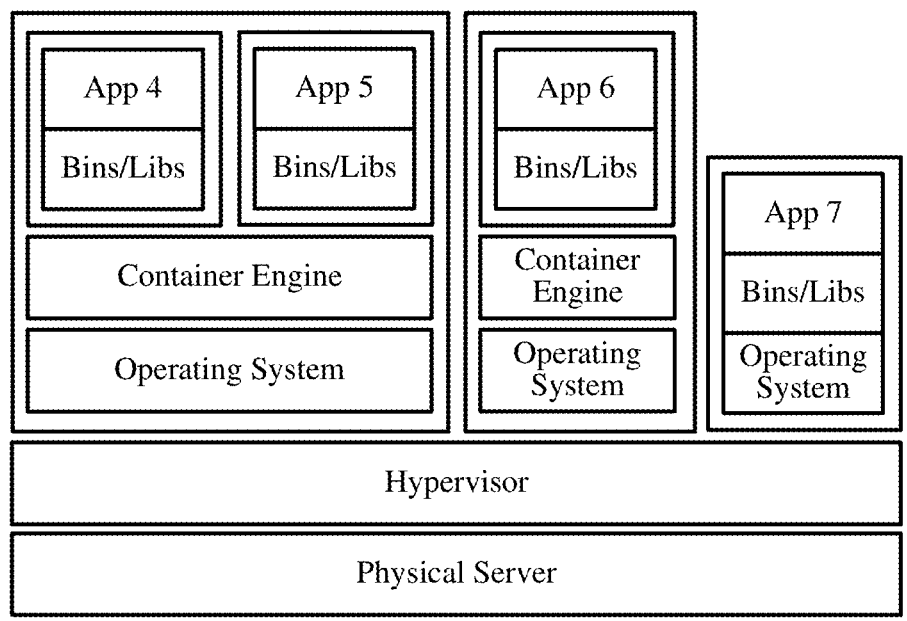

FIGS. 11A and 11B depict block diagrams illustrating example containerized application platform deployments, according to some implementations. As discussed herein, a container orchestration engine and each compute node, e.g., the container orchestration engine 1020 and each compute node 1035a-1035n of FIG. 10, can be deployed or hosted on a shared physical infrastructure (or servers) in various configurations. The examples of FIGS. 11A and 11B depict deployments of containerized applications directly on physical servers (FIG. 11A) and on one or more virtual machines (FIG. 11B), respectively.

FIG. 11A illustrates multiple containerized applications (App 1, App, 2 and App 3) deployed on a physical server. Although multiple applications are shown deployed on the physical server, it is appreciated that one or more of the Apps can be microservices (or portions of an App). Moreover, in some implementations or deployments, a single containerized application can be deployed on a server and the container engine can be a host system, e.g., a Docker Engine.

Referring next to FIG. 11B, FIG. 11B illustrates an example of mixing and matching container engines with "traditional" virtual machines. As shown in the example of FIG. 11B, one or more containerized applications (Apps 1-7) are deployed on virtual machines running on a physical server.

FIG. 12 illustrates computing system 1201 that is representative of any system or collection of systems in which the various processes, programs, services, and scenarios disclosed herein may be implemented. Examples of computing system 1201 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1203. Software 1205 includes and implements process 1206, which is representative of the processes discussed with respect to the preceding Figures. When executed by processing system 1202 to provide packet rerouting, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Continuing with the example of FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including learning process 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide motion learning. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. One or more non-transitory computer readable storage media having a reinforcement-learning agent stored thereon for orchestrating scheduling of resource requests initiated by applications on a shared compute infrastructure, the reinforcement-learning agent comprising:
   a deep neural network configured to approximate a scheduling policy; and
   program instructions that, when executed by one or more processing systems of a computing apparatus, direct the computing apparatus to:
      generate a scheduling map representing (i) for each node of a plurality of nodes of the shared compute infrastructure, how classifications of the resource requests scheduled on the node change over time, and (ii) classifications of incoming resource requests that have yet to be scheduled; and
      feed the scheduling map into the deep neural network to predict one or more nodes of the plurality of nodes on which to schedule the incoming resource requests; and
      schedule the incoming resource requests on the predicted one or more nodes; wherein the reinforcement-learning agent is configured to update the deep neural network by penalizing predictions that result in resource contention, scheduling more resource requests than a node can handle, and delay in moving scheduled resource requests out of a waiting queue.

2. The one or more non-transitory computer readable storage media of claim 1, wherein the program instructions, when executed by the one or more processing systems of the computing apparatus, further direct the computing apparatus to:
   observe a state of the shared compute infrastructure occurring as a result of scheduling the incoming resource requests on the predicted one or more nodes;
   determine a reward or penalty based on the observed state of the shared compute infrastructure; and
   update the deep neural network based on the reward or penalty.

3. The one or more non-transitory computer readable storage media of claim 1, wherein the deep neural network is configured to approximate a function, dependent on one or more policy parameters, that is representative of the scheduling policy, and wherein the scheduling policy comprises a probability distribution over scheduling actions given a state of the shared compute infrastructure.

4. The one or more non-transitory computer readable storage media of claim 1, wherein the reinforcement-learning agent is configured to iteratively update the deep neural network by performing gradient-descent to maximize an expected reward or minimize an expected penalty.

5. The one or more non-transitory computer readable storage media of claim 1, wherein the reinforcement-learning agent is configured to iteratively update the deep neural network by analyzing a reward or penalty to identify and encode application level characteristics of the applications in the scheduling policy.

6. The one or more non-transitory computer readable storage media of claim 5, wherein the application level characteristics include one or more of time varying resource usage patterns of the resource requests, arrival patterns of the resource requests, and temporal dependencies among the resource requests.

7. The one or more non-transitory computer readable storage media of claim 1, wherein the reinforcement-learning agent is configured to iteratively update the deep neural network by analyzing a reward or penalty to identify and encode inherent patterns and characteristics of the resource requests in the scheduling policy.

8. The one or more non-transitory computer readable storage media of claim 1, wherein the scheduling map represents each of the classifications of the resource requests and each of the classifications of the incoming resource requests that have yet to be scheduled as a corresponding color or floating point number.

9. The one or more non-transitory computer readable storage media of claim 1, wherein the scheduling map comprises an image or two-dimensional matrix with multiple sub-matrices of two-dimensions corresponding to each node of the plurality of nodes, and wherein the sub-matrix for each node represents a list of the classifications of the resource requests scheduled on the node in one dimension and time in a second dimension.

10. A system comprising:
    at least one processor; and
    one or more non-transitory computer readable storage media storing instructions that, when executed by the at least one processor, iteratively cause the at least one processor to perform operations comprising:
       generating a scheduling map representing (i) for each node of a plurality of nodes of a shared compute infrastructure, how classifications of resource requests scheduled on the node change over time, and (ii) classifications of incoming resource requests that have yet to be scheduled; and
       generating, based at least on applying the scheduling map to a deep neural network approximating a scheduling policy, a representation of one or more predicted nodes of the plurality of nodes on which to schedule the incoming resource requests;
       scheduling the incoming resource requests on the predicted one or more nodes, and
       updating the deep neural network by penalizing predictions that result in resource contention, scheduling more resource requests than a node can handle, and delay in moving scheduled resource requests out of a waiting queue.

11. The system of claim 10, wherein the operations further comprise:
    observing a state of the shared compute infrastructure occurring as a result of scheduling the incoming resource requests on the predicted one or more nodes;

determining a reward or penalty based on the observed state of the shared compute infrastructure; and update the deep neural network based on the reward or penalty.

12. The system of claim 10, wherein the deep neural network is configured to approximate a function, dependent on one or more policy parameters, that is representative of the scheduling policy, and wherein the scheduling policy comprises a probability distribution over scheduling actions given the state of the shared compute infrastructure.

13. The system of claim 10, wherein the scheduling map represents each of the classifications of the resource requests and each of the classifications of the incoming resource requests that have yet to be scheduled as a corresponding color or floating point number.

14. The system of claim 10, wherein the scheduling map comprises an image or two-dimensional matrix with multiple sub-matrices of two-dimensions corresponding to each node of the plurality of nodes, and wherein the sub-matrix for each node represents a list of the classifications of the resource requests scheduled on the node in one dimension and time in a second dimension.

15. A method comprising:

generating an input space representation of (i) for each node of a plurality of nodes of a shared compute infrastructure, how classifications of resource requests scheduled on the node change over time, and (ii) classifications of incoming resource requests that have yet to be scheduled;

generating, based at least on applying the input space representation to a deep neural network, a representation of one or more predicted nodes of the plurality of nodes on which to schedule the incoming resource requests;

scheduling the incoming resource requests on the predicted one or more nodes; and updating the deep neural network by penalizing predictions that result in resource contention, scheduling more resource requests than a node can handle, and delay in moving scheduled resource requests out of a waiting queue.

16. The method of claim 15, wherein the input space representation represents each of the classifications of the resource requests and each of the classifications of the incoming resource requests that have yet to be scheduled as a corresponding color or floating point number.

17. The method of claim 15, wherein the input space representation comprises an image or two-dimensional matrix with multiple sub-matrices of two-dimensions corresponding to each node of the plurality of nodes, and wherein the sub-matrix for each node represents a list of the classifications of the resource requests scheduled on the node in one dimension and time in a second dimension.

* * * * *